United States Patent [19]

Anderson et al.

[11] Patent Number: 5,878,423
[45] Date of Patent: Mar. 2, 1999

[54] DYNAMICALLY PROCESSING AN INDEX TO CREATE AN ORDERED SET OF QUESTIONS

[75] Inventors: Dewey Charles Anderson, Roswell; Michael R. Grizzard, Norcross, both of Ga.

[73] Assignee: Bellsouth Corporation, Atlanta, Ga.

[21] Appl. No.: 844,751

[22] Filed: Apr. 21, 1997

[51] Int. Cl.[6] .................................................. G06F 17/30
[52] U.S. Cl. ........................... 707/100; 707/1; 707/102; 707/104; 379/88; 379/67
[58] Field of Search .................................. 707/100, 102, 707/104; 379/88, 67

[56] References Cited

U.S. PATENT DOCUMENTS

| | | | |
|---|---|---|---|
| 4,872,122 | 10/1989 | Altschuler et al. | 356/432 |
| 5,005,143 | 4/1991 | Altschuler et al. | 702/181 |
| 5,175,814 | 12/1992 | Anick et al. | 345/348 |
| 5,337,347 | 8/1994 | Halstead-Nussloch et al. | |
| 5,630,125 | 5/1997 | Zellweger | 707/103 |

FOREIGN PATENT DOCUMENTS

WO88/02147  3/1988  WIPO .

OTHER PUBLICATIONS

"nif–T–nav: A Hierarchical Navigator for WWW Pages," by Kirsten L. Jones, Computer Networks and ISDN Systems 28 (1996) 1345–1353.

Primary Examiner—Paul R. Lintz
Attorney, Agent, or Firm—Jones & Askew, LLP

[57] ABSTRACT

An index associated with a database is dynamically processed in an information retrieval system to create a set of questions for use when processing a data inquiry from a user. The index, a structured guide used when searching the database, has different information domains. After one of these domains is selected, a particular order of the index categories within the selected domain is determined, typically by referring to the order lookup table within the index. A script corresponds to the selected domain. Within the script, there are questions corresponding to each index category within the selected domain. These questions are dynamically used to prompt the user. Only the questions corresponding to active index categories are arranged into the set of questions having a question set order corresponding to the particular order of the index categories. In an iterative process, the first question is identified and used to prompt the user to select a term from a scaled down vocabulary of terms (i.e., only those terms associated with the first question and corresponding first index category). Upon selecting the term, a search of the database is performed by the search engine module based upon the selected term. If there is too much information returned from the search, the next question is identified and the iterative process is repeated.

43 Claims, 7 Drawing Sheets

DYNAMICALLY PROCESSING AN INDEX TO CREATE AN ORDERED SET OF QUESTIONS

TECHNICAL FIELD

This invention generally relates to information retrieval and, more particularly described, relates to dynamically processing an index associated with a database in order to create a set of questions for use in a search for information in the database in response to a data inquiry.

BACKGROUND OF THE INVENTION

At the dawn of civilization, cave dwellers may have sat within the dark confines of their cave and scrawled pictorial figures on the walls to record information by the flickering light of their fires. The amount of information recorded by these early historians was probably limited by the amount of space on the stone walls of their cave. With such a limited amount of recorded information, cave dwellers typically searched for information by visually scanning the walls.

Later, Egyptians used papyrus as a writing medium on which to record information. The known universe of information was larger and more information was deemed worthy of recording. As a result of the increased amount of recorded information, searching for specific information began to become more laborious and difficult.

During the Dark Ages, religious orders such as monasteries served as learning centers. These monasteries also served as the archives for much of the recorded information during the time period. Many monks spent their lives recording information into books. For very important information, such as religious texts, some monks hand copied the information and intricately illustrated the information. Again, searching for information became more difficult as the amount of recorded information grew.

As a result of the industrial revolution, what was considered to be the limits of the known universe of information exploded. The amount of recorded information grew at an astounding pace through the space age with the boundaries of human thought and existence being pushed out farther and farther.

As computers were introduced into our society, more and more information has been recorded and made relatively accessible. The global Internet provides an almost unthinkable amount of recorded information. This amount seems to exponentially increase each day. For example, the World Wide Web (the Web) is a portion of the global Internet having hypertext-enabled pieces of information. A few years ago, the Web contained mainly information that was focused in some niche areas, such as science, UNIX, and UFOs. Today, information on the Web comes close to covering all major subject areas and includes information in multimedia formats, such as video and audio information, in addition to a traditional text format. Despite the vast amount of recorded information online, the information on the Web continues to grow at approximately twenty percent per month, according to some commentators.

With such information accessible via a computer and a modem, many people use the online resources of the Internet and the Web as sources of information. However, searching this vast amount of information can be problematic and vary time consuming. The proverbial phrase of finding a needle in a haystack gains new meaning in today's digital culture of endless numbers of Web sites and freely accessible data warehouses. Therefore, there is a need to find ways to efficiently search for and access the right information in a timely manner if we want to avoid frustration and information overload.

There are many ways of searching for information utilized by existing information retrieval systems. These searching methods usually depend on how the information is classified. Information within a database can be classified into hierarchical categories. This organizes the information in a vertical fashion, beginning at very high-level headings working down into lower-level headings. This is traditionally how most people have been trained to organize information. Some search engines on the Web, such as the YAHOO! searching tool found at the Internet address or universal resource location (URL) of http://www.yahoo.com, use this type of hierarchical categorization methodology to organize online information.

In an online example, new online information (in the form of a URL of a new Web site) is regularly added to the Web. Once Web search engines, such as the YAHOO! searching tool, are informed of the new online information, a human being usually classifies or organizes new information. The new information is classified by deciding the appropriate hierarchical heading with which to associate the new information. Unfortunately, this makes categorization of the new information subjective depending on who is actually doing the categorization. Subjective classification of information may lead to misclassified information. For example, a Web site author may believe their site should be classified under a popular hierarchical heading. The human being making the decision may believe the Web site is more appropriately classified under a less popular hierarchical heading. This may be confusing and frustrating to a user searching for information in this new Web site under the popular hierarchical heading.

Information can also be classified in a non-hierarchical or horizontal fashion for searching. Searching using horizontal classifications is similar to searching bottoms-up through information within the database looking for selected terms, also called keywords. One search engine tool that looks for selected terms is the ALTAVISTA search engine tool created by the Digital Equipment Corporation. The ALTAVISTA search engine tool can be found online at the URL of http://www.altavista.digital.com. The ALTAVISTA search engine tool employs a bottoms-up technique where a term is selected and the term is associated with various documents using an inverted index as a lookup table. The inverted index is essentially a table of documents and terms related to the documents. In this manner, horizontal classification supports content-based searching for documents based upon the term. However, horizontal classification does not usually lend itself to searching based upon the context of the term in a document.

Given the existing kinds of information retrieval systems and the vast amount of recorded information that is usually searched, there can be many problems encountered when trying to provide efficient information retrieval. One type of information retrieval system interacts with an inquiring party using scripted questions to efficiently retrieve information. For example, the inquiring party wants to access certain information within a database via the information retrieval system. In order to handle the inquiry for the desired information, the system usually provides large scripts of questions that are written to guide the inquiring party through an interactive process of finding the desired information from within the database. These scripts are usually static because the script is predetermined in what questions are asked and in what order they are asked.

Because of the static nature of the script, the system prompts the inquiring party with each question in the static script according to a predetermined sequence.

Typically, a static script is created and maintained for each domain or grouping of information within the database. For example, if the database contains classified advertising information, the domains may include restaurants or automobiles. In other words, a domain is a highlevel category of the information in the database. A domain may have a corresponding static script which is used by the system in order to find the desired information associated with the domain.

A database usually includes more than one domain or grouping of information. A typical database of information may have over a thousand domains. As the database gets larger with more and more information, the number of domains continues to increase. Accordingly, as the number of domains increases, more static scripts must be created in order to search the database. Creating new static scripts can be time consuming. Additionally, the increasing number of static scripts for the increasing number of domains requires a larger and ever-increasing amount of valuable memory space within the system. As the number of domains increases, the memory requirements may become problematic and the need to create new static scripts for each domain can become burdensome.

Other problems may exist when searching databases with static scripts written for each information domain. For example, the order of questions in a static script may be inappropriate to the inquiry, or one or more questions in a static script may be superfluous. In a given inquiry, the first question in a static script may not be appropriate as the first question because it does not help to focus the search of the database. In such a situation, it is undesirable to ask this first question in the beginning of the static script. To remedy this situation, the order of the questions can be rearranged. However, in order to rearrange the order of questions in the static script, the entire contents of the static script are usually viewed and edited offline to implement the different order of questions. In other words, the whole static script must be laboriously rebuilt offline, which is burdensome and time consuming.

What if there is nothing in the database relative to one of the questions in the static script? As previously described, the system prompts the inquiring party with the questions within the static script according to a predetermined sequence. This can be potentially confusing for the inquiring party if there is no information within the database relative to a question because the system is basically asking about non-existent information. For example, one domain within the database may be related to restaurants. The static script related to the restaurant domain is used to prompt the inquiring party. The static script related to the restaurant domain may include a series of standard questions on restaurants in a fixed order. These questions may include questions on what kind of cuisine, what operating hours are kept (such as Monday through Friday or Saturday), and what amenities are desired (such as valet parking or smoking sections). Typically, these questions are asked in the same sequence each time someone requests information about restaurants. However, if there was no information on restaurant amenities, a system using static scripts would still ask the inquiring party about what amenities are desired. Typically, the system would indicate there is no information about restaurant amenities after prompting the inquiring party about what restaurant amenities are desired or return a null set from the database. Yet, merely asking the question without regard to the available information in the database wastes the inquiring party's time, is a drain upon the resources of the information retrieval system, and may return no information at all. Asking questions without regard to the available information in the database can be especially annoying when repeated questions are asked when no information is available.

Another problem arises when information retrieval system processes inquiries in a voice format. A voice formatted inquiry is typically an inquiry received by the system from an inquiring party who uses a conventional telephone or other telephonic device to interact with the system. When the system processes the voice inquiry, the system typically performs some kind of voice recognition on the voice inquiry. Many voice recognition techniques rely on a vocabulary of words or terms that can be recognized. By comparing the voice inquiry to the vocabulary of terms, the system is able to recognize certain words from the voice inquiry as terms from the vocabulary of terms. However, if this vocabulary is large, the voice recognition technique is usually slower and more prone to inaccuracies.

In summary, there is a need for a system for providing a flexible set of questions within a script used when processing requests for information that (1) more efficiently processes an inquiry, (2) requires less memory when compared to static scripts for each domain, (3) can be easily modified without rebuilding the entire script, (4) is dynamically created according to what kind of information is desired and what information is available in the database, and (5) minimizes the voice recognition processing time and inaccuracies.

SUMMARY OF THE PRESENT INVENTION

The present invention generally provides methods and systems for dynamically processing an index to create a set of questions used when processing a data inquiry. The data inquiry may be carried out at the instigation of an inquiring party or user. The systems may be embodied within and the methods carried out by a stand-alone computer system or a distributed computer system.

In general, an index is essentially a guide that is processed and used to find information from within a database, such as a database of classified advertising information. As is further defined below, an exemplary index may include index categories and domains. An exemplary index may also include terms. In one exemplary index, the index has one or more index categories (such as "Cuisine" or "Brands"). An index category is basically an overlapping grouping of terms. An index category may have terms that are also in other index categories. For example, the term "American" may be associated with the "Cuisine" index category and with the "Brands" index category. The index also has one or more domains. A domain is generally described as a grouping of index categories. For example, a Restaurant domain may include the "Cuisine" index category and, therefore, the "Mexican" and "American" terms. These domains, index categories, and terms are preferably used when attempting to locate information within the database.

Stated generally, the method begins with a step of providing an index. Next, one of the domains from the index is selected. The selection of the domain is preferably indicated by a signal received from the user. The selected domain has one or more index categories. Each index category is associated with a predetermined question used to prompt the user. For example, a question may be used to prompt the user about terms associated with the question's corresponding index category. Thus, by selecting a domain, a set of questions is provided from the questions associated with the index categories in the selected domain. This set of questions may be used for efficient information retrieval.

As noted, the selected domain has one or more index categories. Apart from the index categories, the selected domain is also associated with a portion of the terms in the index. The portion includes only those terms that are included in index categories in the selected domain. Preferably, the terms in the index are scaled to include only terms associated with the selected domain. In this manner, the terms that can be used as a vocabulary of terms for voice recognition is advantageously reduced. Reducing the terms enhances voice recognition speed and accuracy.

Referring yet again to the preferred method, a particular order of the index categories in the selected domain is determined. Typically, the order is determined by reading an order lookup table associated with the index. In response to determining the order of index categories, the questions are arranged according to a question set order. The question set order corresponds to the particular order of the index categories. Preferably, the set of questions includes only those questions that correspond to index categories that are active. An index category is active if the database contains information associated with the index category. In this manner, only the questions which are most useful, given the availability of information within the database, are included within the set of questions.

In addition to the above described steps of the preferred method, a prompt may be provided to a user. The prompt is provided from the set of questions according to the question set order. Typically, the prompt is provided by transmitting a prompt signal to the user. In response to this prompt, the user usually selects a term which is one of the portion of terms in the selected domain. The selection of the term is typically indicated by another signal received from the user.

Next, the database may be searched for information associated with the selected term. After searching the database, the information found during the search may be delivered to the user. Typically the information is delivered by transmitting a signal with the information to the user. In an embodiment of the present invention, the information found during the search is delivered to the user only if the amount of information is less than a predetermined threshold. If the amount of information exceeds the predetermined threshold, the method repeats the prompting and searching process using the next question in set.

More particularly described, an embodiment of the present invention provides a more detailed method for processing the index in order to create the set of questions used when processing a data inquiry. The index is provided having a variety of domains and a variety of terms. In addition to the previous description of an index, an index may be generally described as a data structure which maintains terms associated with information in a database, index categories associated with the terms, domains of particular index categories, and group headings. Each of the group headings are hierarchically-related to each other and correspond to information in the database in a vertical fashion. In other words, the hierarchical relationships between each of the group headings creates a vertical hierarchy with one or more levels.

Pursuant to this embodiment, one of the domains is selected from the index. The selected domain has a variety of index categories. The selected domain is associated with a portion of the terms in the index. Each of the index categories is associated with a question so as to provide a set of questions for the selected domain. Preferably, the terms in the index are scaled so that only the portion of terms associated with the selected domain may be used as a vocabulary of terms for voice recognition.

Next, the particular order of index categories in the selected domain is determined. The questions in the set are then arranged into a question set order. The question set order corresponds to the particular order associated with the index categories in the selected domain. Generally, if any of the index categories are inactive, the question corresponding to the inactive index category is deleted from the set. In this manner, questions corresponding to inactive index categories are effectively skipped from the sequence of questions in the set. Deleting such questions from the set dynamically adapts the set to include only questions related to available information within the database. This, in turn, allows for a more contextual and appropriate response to selections made by a user and permits the data inquiry to be processed more intelligently. Furthermore, deleting such questions from the set avoids wasting valuable transaction processing time and the users time.

Next, the first question in the set is identified from the remaining questions in the set. Typically, the terms of the index are scaled to include only those terms associated with the index category corresponding to the identified question. In this manner, the scaled terms in the index for this data inquiry are limited to terms associated with the identified question.

After the first question is identified, a prompt is provided to the user. The prompt is typically derived from the identified question. Usually, the prompt is provided by transmitting a prompting signal to the user. In response to this prompt, one of the scaled terms is usually selected by the user. The selection of the term is typically indicated by a signal received from the user responding to the prompt. The database is searched for information associated with the selected term. If the amount of information retrieved from the database during the search exceeds a predetermined threshold, the method identifies the next question in the question set order and repeats the above-described steps. However, if the amount of information does not exceed the predetermined threshold, then the information is delivered to the user. Delivery is typically accomplished by transmitting a signal having the information back to the user. From these described steps, the set of questions is dynamically created for use when processing the inquiry from the user.

In yet another embodiment of the present invention, a computer system is described for dynamically processing an index to create a set of questions. The computer system, generally a stand-alone computer, includes a processor, a memory storage device coupled to the processor (such as a hard disk drive) and a communications interface coupled to the processor for communicating with a remote device. The remote device may be a telephone or a remote computer. The memory storage device maintains a script file (for maintaining the questions), a database, and an index associated with the database for use by the processor. Generally, the memory storage device also maintains a variety of terms within the index.

Generally, a portion of the terms within the index are associated with the index categories in a selected domain of the index. In this situation, the processor is typically operative to scale the terms in the index so that only the portion of terms associated with the index categories in the selected domain may be used for voice recognition.

The processor is further operative to determine a particular order associated with index categories in the selected domain. The index categories are stored within the index on the memory storage device. The processor is also operative to arrange the questions into the set of questions for interacting with the remote device. The set of questions has a question set order that corresponds to the particular order associated with the index categories in the selected domain.

Typically, this set of questions includes only those questions that correspond to active index categories. An index category is active if the database contains information associated with the index category. In this manner, the computer system can dynamically process the index in order to create the set of questions in the question set order.

In addition to the computer system as described above, the processor is further operative to transmit a signal to the remote device in order to prompt the user who interacts with the remote device. The content of the signal is derived from one of the questions in the set. The processor is further operative to select one of the terms based upon a response signal received from the remote device. This response signal provides information on the user's selection of the term. The processor is further operative to search the database on the memory storage device for information associated with the selected term. The processor is further operative to transmit a signal having the information to the remote device. The signal is transmitted via the communications interface to the remote device.

More particularly described, another embodiment of the present invention provides a more detailed computer system including a processor, a memory storage device coupled to the processor (such as a hard disk drive) and a communications interface coupled to the processor for communicating with a remote device, typically a telephone or a remote computer. The memory storage device maintains a database, an index (having terms, index categories and domains) associated with the database for use by the processor, and a variety of script files (for maintaining the questions corresponding to each index category in the index). Each script file individually corresponds to one of the domains within the index.

Within the computer system, the processor is operative to select one of the domains in response to a signal received from the remote device via the communications interface. A portion of the terms are associated with the index categories in the selected domain. In this situation, the processor is typically operative to scale the terms in the index so that only the portion of terms associated with the index categories in the selected domain may be used for voice recognition.

The processor is further operative to determine a particular order associated with the index categories in the selected domain and to arrange the questions corresponding to these index categories into the set of questions. The questions in the set have a question set order corresponding to an order of the index categories in the selected domain. Generally, this set of questions includes only those questions that correspond to active index categories. An index category is active if the database contains information associated with the index category. In this manner, the computer system is able to dynamically process the index in order to create the set of questions.

The processor is further operative to identify a first question from the set of questions according to the question set order and to prompt the remote device with the identified question. Typically, the remote device is prompted when the processor transmits a signal to the remote device via the communications interface. The transmitted signal is derived from the first question. Generally, the processor is also operative to scale the terms of the index. By temporarily scaling the terms in the index as described above, only the portion of terms associated with the first index category and the first question may be used for voice recognition.

In response to a selection signal from the remote device, the processor is further operative to select one of the terms associated with the first index category. Typically, the selected term is one of the scaled terms associated with the first index category and the first question.

The processor is further operative to search the database on the memory storage device for information related to the selected term. If the amount of information found during the search exceeds a predetermined threshold, the processor is operative to identify the next question in the set and perform the above-described prompting, selecting, and searching functions. Otherwise, the processor is operative to provide the information to the remote device, preferably via a signal transmitted through the communication interface.

Yet another embodiment of the present invention is a distributed computer system for dynamically processing an index to create a set of questions. The distributed computer system includes a backend computer and one or more frontend computers connected to the backend computer by a network. The system also has a backend memory storage device coupled to the backend computer. This backend memory storage device maintains a database, an index (usually having terms, index categories, and a domain) associated with the database, and a script file corresponding to the domain in the index. Each frontend computer has a memory and also has a service communication interface for communicating with remote devices, such as telephones or remote computers.

The backend computer provides each of the frontend computers with access to the database, index, and script files centrally located on the backend memory storage device. Each of the frontend computers is operative to copy these files (the database, index, and script file) from the backend memory storage device into their respective memories, such as RAM or any memory storage device local to each frontend computer. In this manner, each frontend computer maintains its own local version of these files and avoids the need to access the backend memory storage device during transactional processing of data inquiries from the remote devices.

Once these files are copied, the frontend computer selects the domain from the copied index in response to a signal received from the remote device via the service communication interface. Typically, there are a variety of terms within the copied index. A portion of these terms is associated with the index categories in the selected domain. In this situation, the frontend computer may scale the terms in the copied index so that only the portion of terms associated with the index categories in the selected domain may be used for voice recognition.

The frontend computer further determines a particular order associated with index categories in the selected domain. These index categories are stored within the copied index within the memory of the frontend computer. The frontend computer also arranges the questions from the copied script file into the set of questions for interacting with the remote device via the service communication interface. This set of questions has a question set order that corresponds to the particular order associated with the index categories in the selected domain.

Typically, this set of questions includes only those questions that correspond to active index categories. An index category is active if the copied database contains information associated with the index category. In this manner, the distributed computer system is able to dynamically process the copied index in order to create a set of questions used when processing data inquiries from the remote devices.

In addition to the distributed computer system as described above, the backend computer is able to update the database, index, and script file maintained on the backend memory storage device. By centrally providing and updating these files on the backend memory storage device, the need to individually update the copied files on each frontend computer is avoided.

Furthermore, the frontend computer can transmit a signal to the remote device, via the service communication interface, in order to prompt the user interacting with the remote device. The content of the transmitted signal is derived from one of the questions in the set of questions. The frontend computer generally scales the terms in the copied index so that only the portion of terms associated with the selected domain may be used for voice recognition.

The frontend computer selects one of the terms based upon the content of a response signal received from the remote device via the service communication interface. The response signal contains information on the user's selection of the term. The frontend computer searches its copied database for information related to the selected term and transmits a signal through the service communication interface to the remote device having the information.

Although the exemplary embodiments of the present invention are directed towards systems and methods for dynamically processing an index associated with a database of classified advertising information, it should be understood that the present invention may be applied to a broad variety of other information retrieval systems and databases.

In summary, it is an object of the present invention to provide a system and method for efficiently processing a data inquiry from a user.

It is a further object of the present invention to provide a flexible set of questions for use when processing requests for information.

It is still a further object of the present invention to dynamically create a set of questions so that an inquiry is more efficiently processed.

It is still a further object of the present invention to provide a set of questions that requires less memory when compared to questions with static scripts.

It is still a further object of the present invention to create a set of questions in a script file which can be easily modified.

It is still a further object of the present invention to dynamically create the set of questions according to what information is desired and is available within the database.

It is still a further object of the present invention to provide a vocabulary of terms within the index that is scaled according to the desired area of interest in order to reduce voice recognition processing time and inaccuracies.

The present invention and its object and advantages, those described above and otherwise, will be appreciated from studying the following detailed description and drawings, and the appended claims.

DETAILED DESCRIPTION OF THE PREFERRED EMBODIMENT

Definitions

Figure 1:
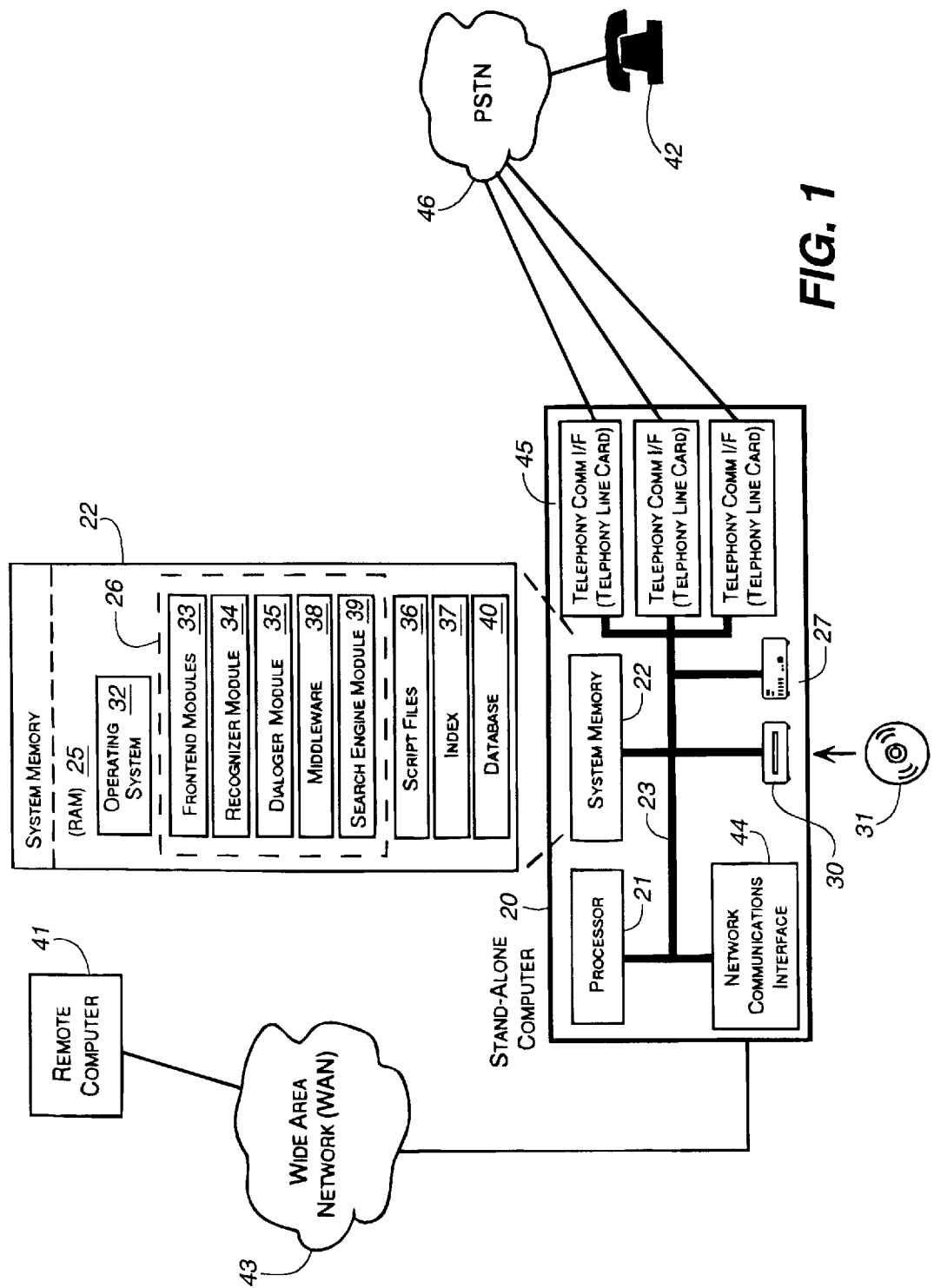
FIG. 1 is a block diagram of a computer system that provides an exemplary operating environment for an embodiment of the present invention.

Throughout the detailed description of embodiments of the present invention, terms familiar to one skilled in the art will be used. Additionally, the following definitions should be used in reference to embodiments of the present invention:

"ACTIVE INDEX CATEGORY"—an index category associated with existing information within a database.

"DOMAIN"—a high-level organizational unit or grouping of index categories within an index to a database.

"INACTIVE INDEX CATEGORY"—an index category which is not associated with any existing information currently within a database.

"INDEX"—a structured guide or tool, associated with a database, used to find information within the database.

"INDEX CATEGORY"—an organizational grouping of terms within an index to a database.

"GROUP HEADING"—a hierarchical grouping of information within the database.

"ORDER ATTRIBUTE"—an indicator of the order of index categories within a particular domain.

"ORDER LOOKUP TABLE"—a table used to store the order of index categories within a particular domain.

"QUERY SET"—one or more terms selected by the user as desired search criteria used when searching a database.

"QUESTION"—an inquiry message used to prompt a user of an information retrieval system.

"QUESTION SET ORDER"—an order or sequence of questions within a set of questions.

"SCRIPT"—a collection of potential questions associated with index categories within a particular domain.

"SET OF QUESTIONS"—a particular grouping of questions from a script.

"SIGNAL"—any type of waveform, indication, or message to or from an information retreival system.

"TERM"—a keyword or phrase contained within the index to the database related to information within the database.

"VOCABULARY OF TERMS"—a set of the terms used as a vocabulary when performing voice recognition.

Introduction

The present invention is directed to a system and methods for dynamically processing an index associated with a database in order to create a set of questions used when searching the database for information. The index is essentially a guide used to find information from within a database, such as a database of classified advertising information. An exemplary index has keywords, preferably called terms. The index also has categories of these terms, preferably called index categories. The index categories are basically overlapping groupings of the terms. One index category may have terms that are also in other index categories. The index also has one or more domains, each of which are associated with particular index categories. A domain, also called an information domain, is basically a grouping of index categories, similar to a grouping of terms in each index category. These domains, index categories, and terms may be used when attempting to locate information within the database.

The preferred embodiment of the present invention is represented by a group of software modules operating as an interactive information retrieval system (hereinafter the IR system) that uses or processes the index when retrieving information from the database. Briefly described, the IR system allows a user to select, via voice or digital communication signals, one of the domains within the index. Based upon the selected domain, one of the software modules determines which index categories and terms correspond to the selected domain. By reducing or scaling the possible terms in the index down to a portion of terms that are associated with the selected domain, information retrieval can be more efficiently and more accurately performed. An example of where scaling the terms in the index is useful is when the IR system interprets responses to scripted questions.

Each index category has an associated question. A question embodies a static query used to prompt the user about the corresponding index category. For example, the index may have information domains on restaurants and automobiles. If the restaurant domain were selected and has a "Cuisine" index category, a question associated with the index category may be: "Please state the type of cuisine you desire." An example of another question may be: "What hours of operation do you desire?" This other question could be associated with an "Operation Hours" index category which could be associated with either the "Restaurant" domain or an "Automobiles" domain.

Additionally, the index categories within a domain are arranged in a particular order. This order reflects which index categories are more important and more useful when searching for information. In other words, the first index category in the order has a higher priority in terms of searching than the last index category in the order.

One of the software modules in the preferred IR system is able to dynamically build or create a set of these questions in a question set order. This question set order corresponds to the order of the index categories for the selected domain. Thus, when a domain is selected, the questions for the index categories in that domain are arranged into the set. The order of questions in the set (i.e., the question set order) reflects the importance or priority of the question with respect to each question in the set. In this manner, the questions associated with each index category are like fundamental building blocks used to dynamically build the set of questions in a customized order. The customized order depends on the domain and the available information in the database related to the domain.

By dynamically creating the set of questions, the need for larger static scripts for each domain is avoided. The process of dynamically creating the set of questions can be especially advantageous when there are a large number of domains and index categories within the index.

The questions within the set are used, according to the question set order, to interact with a user of the preferred IR system when the user desires to retrieve information from the database. The creation and use of such a set of questions is the general focus of the present invention.

Although the preferred embodiment is generally described in the context of the software modules in the IR system used with a computer system, those skilled in the art will recognize that the present invention also can be implemented in conjunction with objects and other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet. An example of such a distributed computing environment is described below with regard to FIG. 2. Other methods and system implementations will occur to those skilled in the art.

The detailed description which follows is represented largely in terms of processes and symbolic representations of operations by conventional computer components, including a processor, memory storage devices, data communication networks, and communications interfaces such as telephony line cards or network interface cards. Furthermore, these processes and operations may utilize conventional computer components in a heterogeneous distributed computing environment, including remote file servers (such as a backend server described in FIG. 2), compute servers, and remote memory storage devices.

The processes and operations performed by the computer, in both a stand-alone environment and a distributed computing environment, include the manipulation of signals by a processor and the maintenance of these signals within data sets, such as the database, and data structures, such as the index. Each of these data sets and data structures are resident in one or more memory storage devices. Basically, a data set is a collection of related information in separate elements that are manipulated as a unit. A data structure is a structured organizational scheme that encapsulates data in order to support data interpretation and data operations. The data structure imposes a physical organization upon the collection of data stored within a memory storage device and represents specific electrical or magnetic elements. In the context of the present invention, a data structure can be created from the separate elements or objects of a data set or another data structure. An index is an example of such a data structure. In the context of the present invention, a database can be a data set or a data structure depending on the particular implementation. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, an index, terms, index categories, domains, data, objects, images, files or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as providing, arranging, searching, transmitting, receiving, prompting, determining, identifying, storing, selecting, deleting, etc. which are often associated with manual operations performed by a human operator. The operations described herein are machine operations performed in conjunction with various input provided by a human operator or user that interacts with the computer or a device connected to the computer.

In addition, it should be understood that the programs, processes, methods, etc. described herein are not related or limited to any particular computer (standalone or distributed) or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hardwired logic or programs stored in nonvolatile memory, such as read only memory.

Referring now to the drawings, in which like numerals represent like elements throughout the several figures, aspects of the present invention and the preferred operating environment are described.

The Operating Environment

Figure 2:
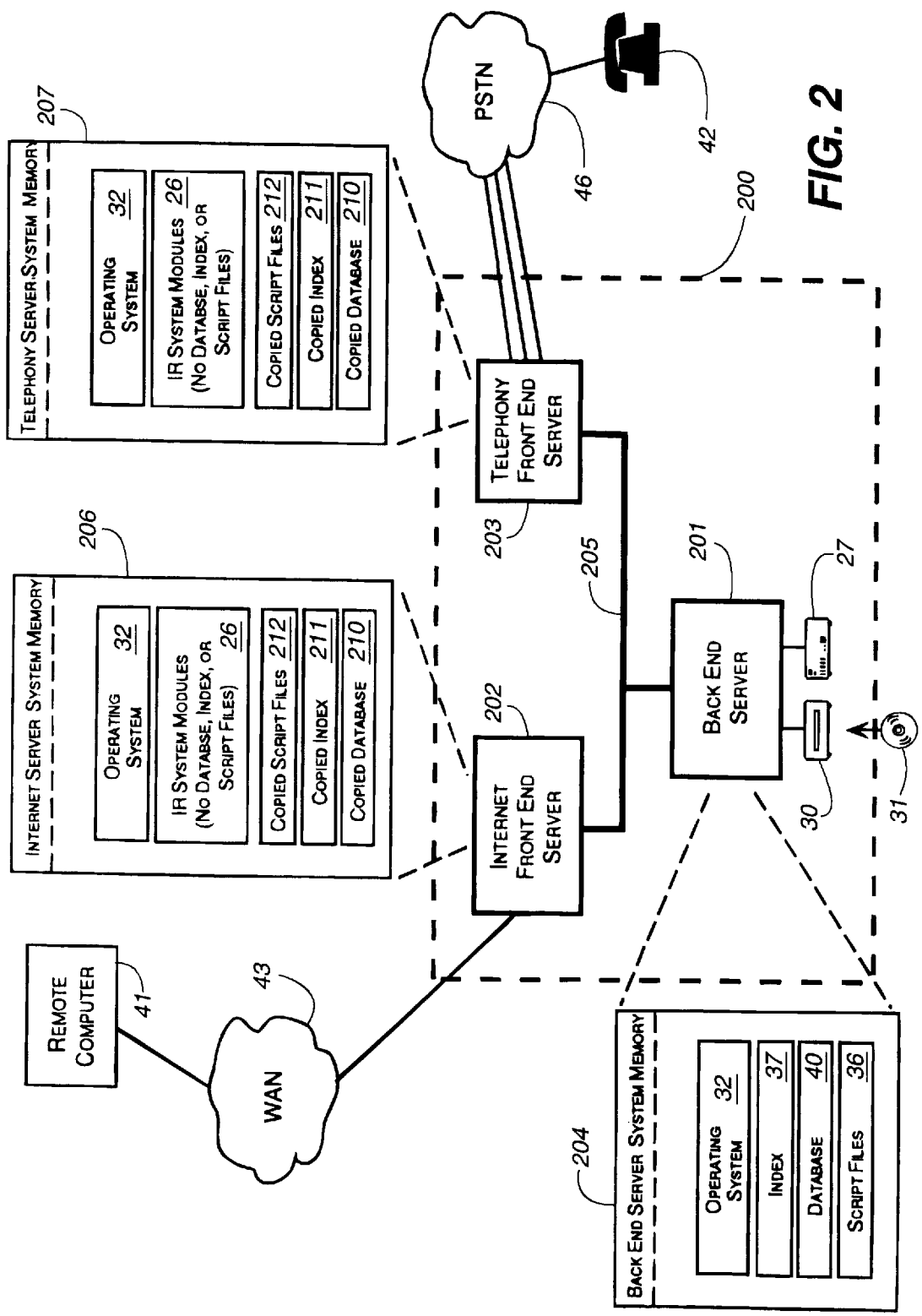
FIG. 2 is a block diagram of a distributed computer system that provides an exemplary operating environment for an embodiment of the present invention.

FIGS. 1 and 2 and the following discussion are intended to provide a brief, general description of exemplary computing environments in which the present invention may be implemented and operated. While the invention is described in the general context of software program modules that run on an operating system in conjunction with a multitasking computer, those skilled in the art will recognize that the invention may also be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Those skilled in the art will immediately appreciate that FIGS. 1 and 2 and the associated discussion are intended to provide a brief, general description of exemplary computer hardware and program modules, and that additional information is readily available in the appropriate programming manuals, users guides, and similar publications.

Referring now to FIG. 1, an exemplary stand-alone computer system for implementing the present invention includes a conventional stand-alone computer 20, including a processor 21, a system memory 22, and a system bus 23 that couples the system memory 22 to the processor 21. The system memory 22 includes random access memory (RAM) 25. The stand-alone computer 20 further includes a hard disk drive 27 and an optical disk drive 30 (e.g., a disk drive that reads from a CD-ROM disk 31 or reads from or writes to other optical media). The hard disk drive 27 and the optical disk drive 30 are connected to the system bus 23. The drives and their associated computer-readable media provide nonvolatile storage for the stand-alone computer 20. Although the description of computer-readable media above includes the hard disk drive 27 and the optical disk 31, such as a CD, it should be appreciated by those skilled in the art that other types of media which are readable by a computer, such as removable magnetic disks, magnetic cassettes, flash memory cards, digital video disks and tapes, Bernoulli cartridges, and the like, may also be used in each of the exemplary operating environments described with regard to FIG. 1 and FIG. 2.

A number of program modules may be stored in the drives 27, 30 and RAM 25, including an operating system 32 and a variety of other software program modules. In an embodiment of the present invention, an example of such software modules is a group of software modules collectively referred to as the interactive information retrieval system modules 26 (IR system modules). The IR system modules 26 preferably include the following software modules:

one or more frontend modules 33, a recognizer module 34, a dialoger module 35 (which interacts with script files 36 and an index 37 and dispatches search requests to the search engine 39), a middleware layer of software 38, and a search engine 39 (which interacts with a database 40 stored on the hard disk drive 27 or on the optical disk 31 in the optical disk drive 30).

When any of the IR system modules 26 are used, the processor 21 may only bring a portion of the module into memory at a time due to the size of the module. For example, the operating system 32 and the database 40 are shown as residing within RAM 25. However, in the preferred embodiment, only a portion of these software modules are maintained within RAM 25 due to their prohibitive size. The software modules comprising the IR system modules 26 are discussed in greater detail below with regard to FIGS. 3–4.

The operating system 32 provides the basic interface between the computers hardware and software resources, the user, and the IR system modules 26. In the exemplary operating environments described with regard to FIGS. 1 and 2, the operating system 32 is preferably a real-time operating system, such as the SOLARIS operating system, produced by SunSoft, a division of Sun Microsystems. A realtime operating system is desired in order to provide adequate response when searching and interacting with multiple users. The SOLARIS operating system has a multithreaded, symmetric multiprocessing, real-time UNIX kernel. Those skilled in the art will appreciate the need for real-time, multithreaded performance in information retrieval applications in order to support an adequate level of transactional performance. Additional information regarding the SOLARIS operating system is available by reference to system manuals published by Sun Microsystems and other widely available literature on UNIX operating systems.

As with most conventional computer systems, a user may enter commands and information into the stand-alone computer 20 through a keyboard (not shown) and an input or pointing device, such as a mouse (not shown). Other input devices (not shown) may include a microphone, a joystick, a game pad, a satellite dish, a scanner, or the like. These and other input devices are often connected to the processor 21 through a serial port interface (not shown), such as a game port or a universal serial bus (USB), connected to the system bus 23. A monitor (not shown) or other type of display device can also be connected to the system bus 23. In addition to the monitor, computers such as the stand-alone computer 20 typically include other peripheral output devices (not shown), such as speakers, printers, and backup devices.

In the preferred embodiment, a user typically interacts with the stand-alone computer 20 when the stand-alone computer 20 functions in a server capacity. In this capacity, the stand-alone computer 20 can service a remote programmable device, such as a remote computer 41, or a telephone device, such as a conventional telephone 42, each of which is logically connected to the stand-alone computer 20.

The remote computer 41 may be a server, a router, a peer device, or other common network node. Typically, the remote computer 41 includes many or all of the elements described relative to the standalone computer 20. The logical connection between the remote computer 41 and the stand-alone computer 20 depicted in FIG. 1 is a data communications network, such as a wide area network (WAN) 43. Other examples of data communications networks include enterprise-wide computer networks, intranets, or the global Internet. A communications interface, such as a network communications interface 44 in the stand-alone computer 20, links the WAN 43 and the standalone computer 20. However, the logical connections to the stand-alone computer 20 may also be a local area network (LAN) (not shown) that is commonplace in offices. Typically, a user of the remote computer 41 interacts with the stand-alone computer 20 via such logical connections in order to search the database 40 for information and to respond to scripted questions posed by the stand-alone computer 20.

A telephony communication interface 45 (also known as a telephony line card) connected to a conventional public switched telephone network 46 (PSTN) provides the logical connection between the stand-alone computer 20 and the conventional telephone 42. In this manner, the user can interact with the stand-alone computer 20 with voice responses via a conventional telephone 42 or other telephonic device. In the preferred embodiment, the telephony communication interface 45 is a Model Antares 2000 telephone line interface card manufactured by Dialogic Corporation of Parsippany, New Jersey. Both the network communications interface 44 and the telephony communication interface 45 are generally referred to as "communication interfaces" because the stand-alone computer 20 provides the service of processing data inquiries through both of these interfaces. It will be appreciated that the network and telephone connections shown are exemplary and other means of establishing a communications link between the stand-alone computer 20 and the remote computer 41 or conventional telephone 42 may be used.

In FIG. 2, a block diagram of a distributed computer system is illustrated that also provides an exemplary operating environment for an embodiment of the present invention. Referring now to FIGS. 1 and 2, the distributed computer system 200 comprises a backend server 201 and one or more front end servers, such as an Internet frontend server 202 or a telephony front end server 203. Typically, only one Internet frontend server 202 is required. However, if multiple geographic locations are served by a telephony frontend server 203, the distributed computer system 200 typically includes multiple telephony frontend servers 203.

In this distributed computing environment, the functions performed by the stand-alone computer 20 can be broken apart and allocated to each of the servers 201–203. In this manner, resources can be dedicated in order to more efficiently interact with users and search the database (via the Internet front end server 202 and the telephony front end server 203) and for centralizing file storage and maintenance of certain data files (via the backend server 201). The ability to break apart and allocate the functions to different servers is advantageous because users can rely on dedicated hardware and software for enhanced transactional processing.

Furthermore, the manner of providing the database 40, the index 37, and the script files 36 is simplified by providing access to these software modules from a central location. Only the software modules in the central location need be updated. From the central location, each frontend server 202–203 can then access and copy the most up-to-date software modules used when processing data inquiries. Thus, centrally maintaining these files is preferred over individually updating these software modules in each server 202–203.

The backend server 201 is similar to the stand-alone computer 20 from a hardware perspective. The backend server 201 has a system memory 204 and memory storage devices (such as the hard disk drive 27 and the optical disk drive 30) which are used to maintain the database 40, the index 37, and the script files 36. By maintaining the database 40, the index 37, and the script files 36 in this central location, they are easier to consistently maintain and update. The backend server 201 provides each of the frontend servers 202–203 access to these files over a conventional data network 205 (LAN, WAN, etc.) that electronically connects the backend server 201 to the frontend servers 202-203. While the backend server 201 is preferably a file server for centrally maintaining and updating these files, it is contemplated that the backend server system memory 204 may also include the IR system modules 26 in order to operate similar to the stand-alone computer 20. In this manner, the backend server 201 may function as a peak-time frontend server when needed to assist one of the frontend computers 202–203.

Each of the frontend servers are very similar to the standalone computer 20 from a hardware perspective and from a software perspective. The Internet frontend server 202 preferably includes each feature of the stand-alone computer 20, but does not need any telephony communication interfaces 45. The network communication interface 44 on the Internet frontend server 202 is used to communicate with the backend server 201. The telephony frontend server 203 essentially has the same elements as the stand-alone computer 20. Similar to the Internet frontend server 202, the network communication interface 44 on the telephony frontend server 203 is used to communicate with the backend server 201.

Essentially, the frontend servers 202–203 interact with users and process user's requests for information. In one situation, the remote computer 41 is configured as a remote device manipulated by the user via data entry. The remote computer 41 interacts with the Internet frontend server 202 via the WAN 43 and a service communication interface (preferably similar to the network communication interface 44) within the Internet frontend server 202. In this situation, the remote computer 41 preferably communicates with the Internet frontend server 202 using a conventional hypertext transfer protocol (HTTP). Thus, the Internet frontend server 202 preferably functions as a Web server providing the remote computer 41 with access to information within the database 40.

In another situation, a conventional telephone 42 or other telephonic device is the remote device manipulated by the user via voice input. The telephone 42 interacts with the telephony frontend server 202 via the PSTN 46 and a service communication interface (such as a telephony line card 45) within the telephony frontend server 203. Data inquiries from the user are processed locally by each frontend server 202–203 in a timely manner using the copied files (i.e., the copied database 210, the copied index 211, and the copied script files 212) along with the IR system modules 26.

Each frontend server 202–203 accesses the backend server 201 in order to make copies of the database 40, the index 37, and the script files 36 from the backend server 201. These copied files (i.e., the copied database 210, the copied index 211, and the copied script files 212) are typically maintained by the frontend servers 202–203 within a memory storage device (not shown) within each frontend server. Each of the frontend servers 202–203 have system memory 206–207 and memory storage devices (not shown) which are used to maintain the copied files and the IR system modules 26. In this manner, each frontend server 202–203 has local access to these copied files and avoids unnecessary traffic across the data network 205 when individually processing data inquiries from users interacting with the frontend servers 202–203. Thus, the frontend servers 202–203 can focus their operation on serving users by utilizing the copied files (i.e., the copied database 210, the copied index 211, and the copied script files 212) along with the IR system modules 26.

As discussed earlier, the preferred embodiment of the present invention is embodied in the IR system modules 26 which are designed to operate in stand-alone and distributed computing systems in conjunction with SunSoft's SOLARIS operating system. However, it should be understood that the invention can be implemented for use with other computer architectures, such as multiprocessing systems. Furthermore, it should be understood that the invention can be implemented for use with other operating systems, such as Microsoft Corporation's "WINDOWS NT" operating system, IBM Corporation's AIX operating system, and Hewlett-Packards HP-UX operating system or RT-UX operating system.

From this brief description, it should be appreciated that operating systems, such as the "SOLARIS" operating system, and networking architectures are quite complex and provide a wide variety of services that allow users and programs to utilize the resources available in the computer or in other computers in a distributed computing environment. Those skilled in the art will be familiar with operating systems, networking architectures and their various features. Likewise, those skilled in the art will appreciate that the IR system modules 26 provide a wide variety of features and functions in addition to those included in the brief description presented above.

Figure 3:
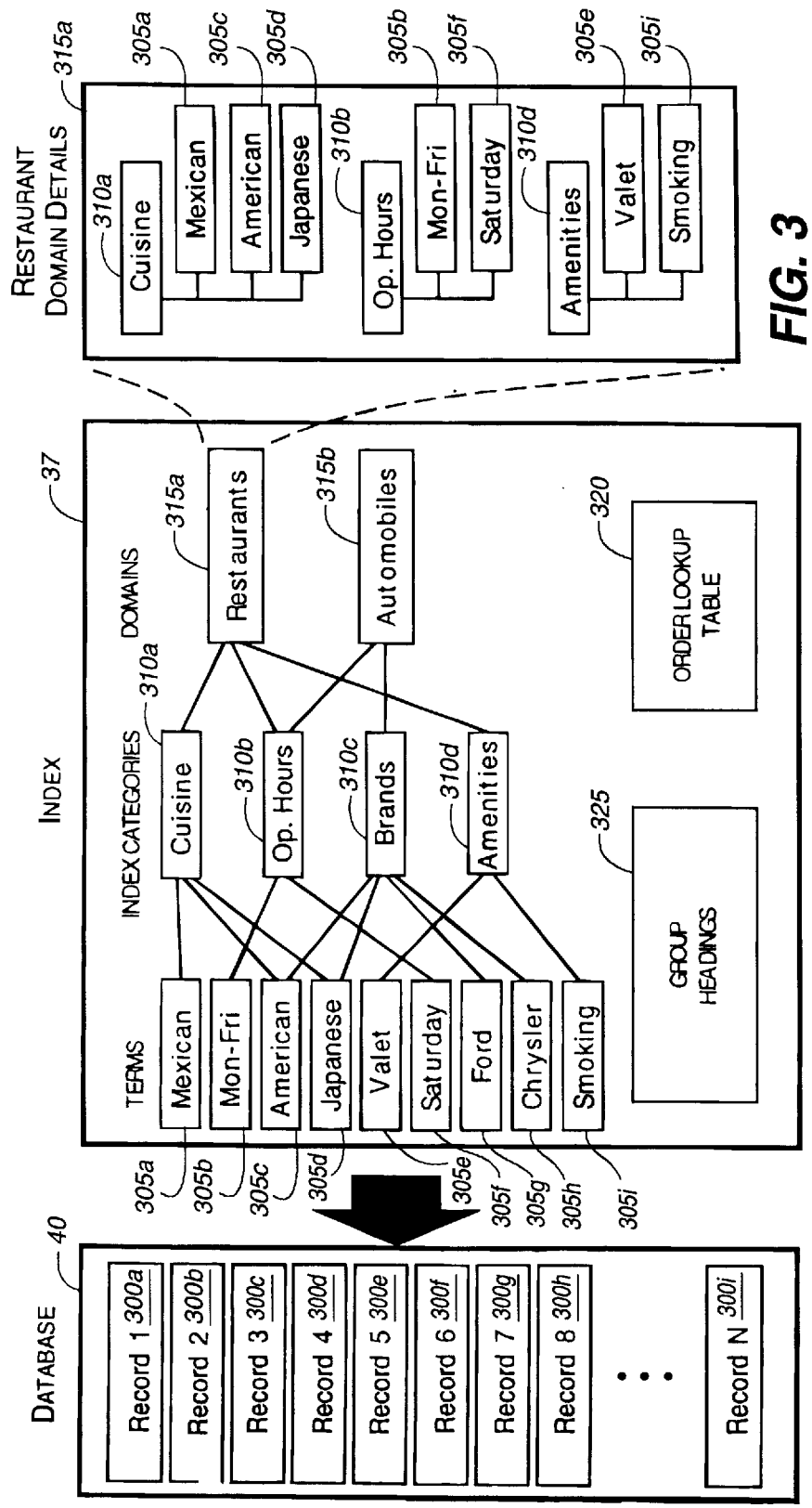
FIG. 3 is a diagram illustrating the relationship between an exemplary database, an exemplary index, and an exemplary domain within the exemplary index.
Figure 4:
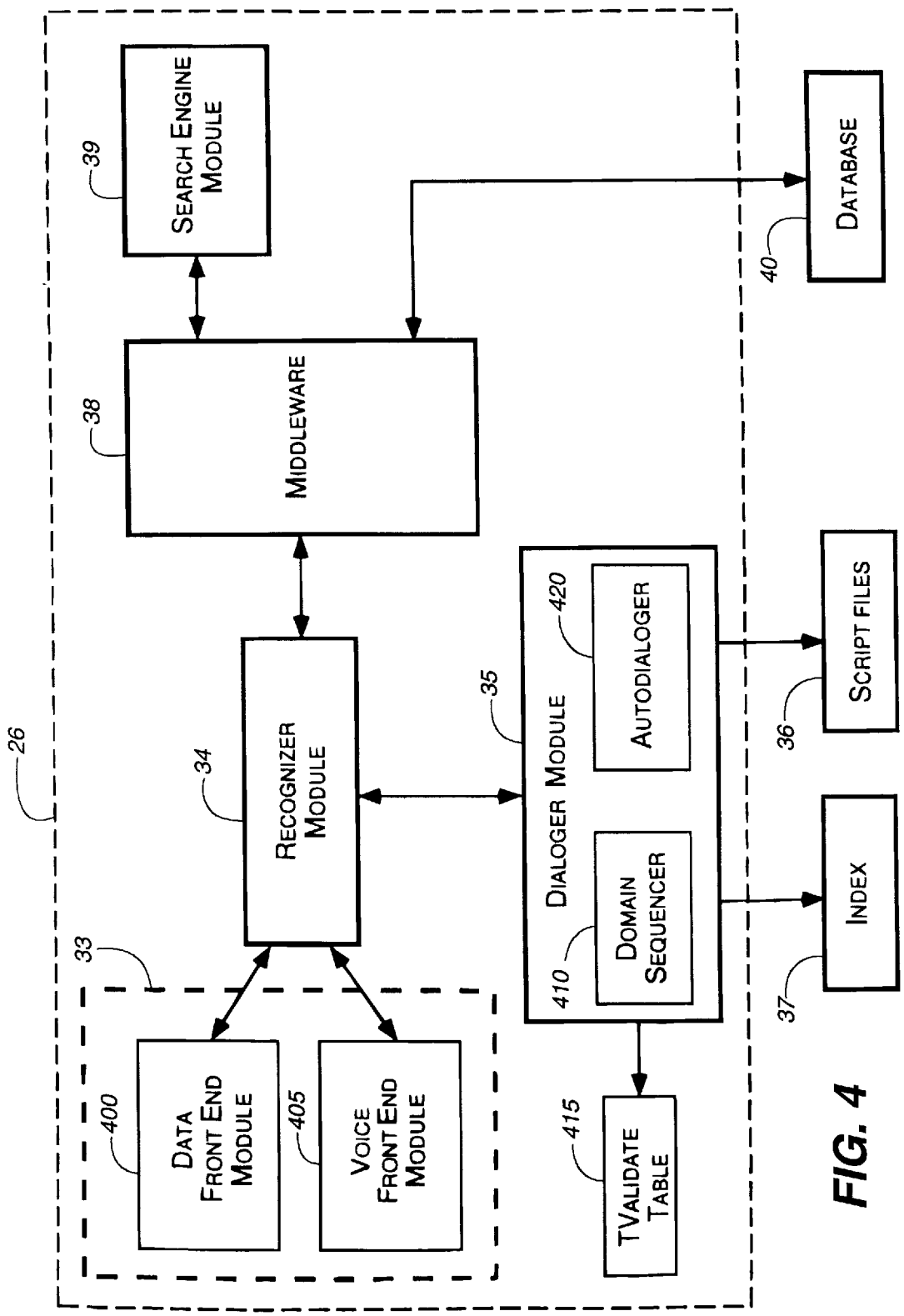
FIG. 4 is a diagram illustrating software components and their operative interrelationships in the preferred embodiment of the present invention.
Figure 5:
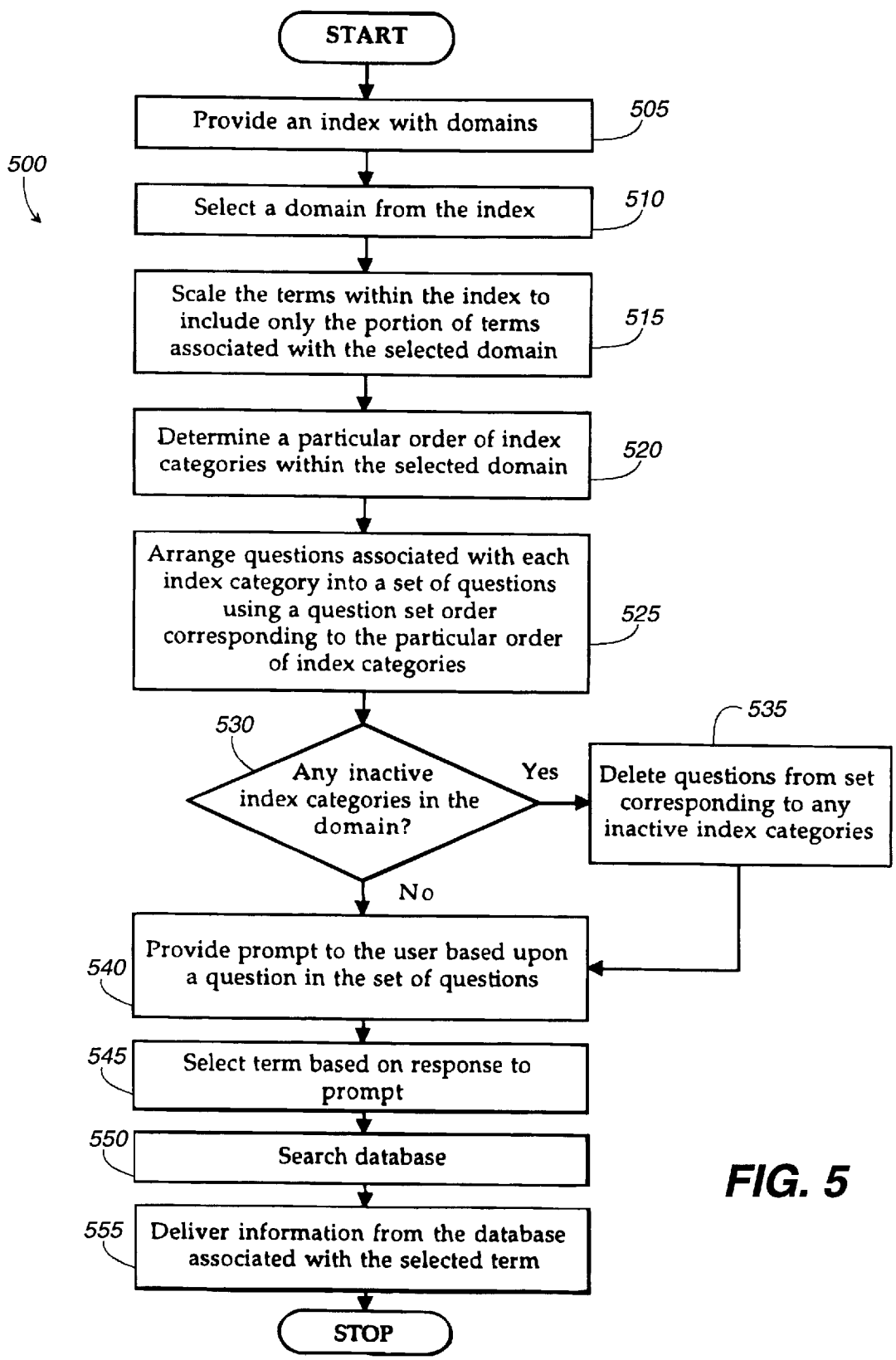
FIG. 5 is a flow diagram illustrating steps of the preferred method for dynamically processing an index to create a set of questions.

Turning now to FIGS. 3–6, an exemplary embodiment of the present invention is described. FIG. 3 is a diagram illustrating the relationship between an exemplary database, an exemplary index, and an exemplary domain within the index. FIG. 4 is a diagram illustrating software components, including the database and the index, and their interrelationships with other software components in the exemplary embodiment of the present invention. FIGS. 5 and 6 are flow diagrams which illustrate the preferred steps for dynamically processing an index associated with a database to create a set of questions used when searching for information in the database.

The Database/Index Relationship

Referring now to FIGS. 1 and 3, an exemplary database 40 is illustrated which contains a multitude of records 300a–i. Each record 300a–i contains specific information. An example of such information may be information about a restaurant describing the kind of cuisine of the restaurant, the location, the hours of operation, payment methods, and any offered amenities. Another example of such information may be information about an automobile sales center describing the kind of cars it sells, the models it sells, and its hours of operation. While the database 40 is shown as a data set of flat-file records 300a–i, it is contemplated that the database 40 could be a data structure comprising records 300a–i, which would essentially be relational tables.

In the preferred embodiment, the database 40 is typically maintained on the hard disk drive 27 because databases are typically too large in size to bring into RAM 25 all at once. However, the present invention is not limited to such a situation. The present invention contemplates that the database 40 is located in any kind of computer-readable medium, such as RAM 25, on the hard disk drive 27, on the CD 31 in the optical disk drive 30, a removable magnetic disk (not shown), etc. Furthermore, those skilled in the art will recognize the ability to read portions of large files, such as the database 40, into RAM 25 in a conventional swapping mode is known in order to access large files.

An exemplary index 37 associated with the database 40 is also illustrated. As previously discussed, the index 37 is essentially a guide or tool used to help navigate through records 300a–i of the database 40 when trying to find specific information. Using the index 37, the user is able to easily build a specific query set and to more efficiently search the database 40.

In the preferred embodiment of the present invention, the index 37 includes a variety of keywords or terms 305a–i that are associated with specific records 300a–i in the database 40. A term is associated with a record when the record includes the term. For example, in the exemplary index 37, the term "Ford" 305g may be associated with a record 300a because the record 300a includes the term "Ford" 305g in one of the fields or tables that make up the record 300a.

The index also has categories of these terms 305a–i, called index categories 310a–d. Index categories are basically groups of terms. Index categories can overlap each other with respect to the terms associated with each index category. For example, in the exemplary index 37, one of the terms is "American" 305c. As previously discussed, this term is associated with particular records containing the term "American" 305c. The term "American" 305c is also associated with two different index categories ("Cuisine" 310a and "Brands" 310c). In this manner, the term "American" 305c and the "Cuisine" 310a and "Brands" 310c index categories associated with the term "American" 305c are associated with the same records in the database 40.

The exemplary index 37 also comprises information domains, such as Restaurants 315a and Automobiles 315b. A domain, such as Restaurants 315a, is essentially a grouping of index categories and their respective associated terms. For example, the Restaurant domain 315a is associated with index categories labeled Cuisine 310a, Op. Hours 310b, and Amenities 310d and each of their respective associated terms. Each domain 315a–b can have index categories which are associated with other domains.

Typically, the index 37 is processed when responding to data inquiries for information within the database 40. A user can select a domain 315a–b in order to narrow a search of the database 40. The terms in the index are scaled when the domain is selected to include those terms associated with the index categories in the selected domain. In this manner, the terms in the index are temporarily scaled into a working group called the vocabulary of terms. For example, if the Restaurant domain 315a is selected, the terms are temporarily scaled to include only those terms associated with the index categories labeled Cuisine 310a, Op. Hours 310b, and Amenities 310d.

A question is used to prompt the user to select a term from one of the index categories. The question is associated with an index category. Again, the vocabulary of terms is temporarily scaled to include only the portion of terms associated with that index category. In this manner, the vocabulary of terms is used as the field of possible choices. By scaling these terms, the possible choices for the user are limited. This limitation is advantageous for quickness and accuracy when the user's response is interpreted by voice recognition techniques.

When the user responds to the scripted question, a term (i.e., one from the scaled terms) is selected. The database 40 is then searched for information within the records 300a–i related to the selected term. If there are too many records that are related to the selected term, additional terms from other index categories may be selected and used when searching the database 40. Thus, the index 37 is used as a tool for efficiently processing data inquiries before an actual search of the database 40 must take place. By processing the index 37 to scale the terms in the index 37, the overall transaction (data inquiry, prompts for the user, searching the database 40) is quicker and the computer system processing the search is free to process additional data inquiry and information retrieval transactions.

In addition to scaling terms, the preferred information retrieval system enhances information retrieval using an ordering concept for index categories. An order lookup table 320 is also associated with the index 37. This order lookup table 37 maintains a particular order of the index categories 310a–d in each domain 315a–b. When searching the database 40 for information, certain index categories in a given domain are more important and are given a higher priority than others. The particular order associated with the index categories in a domain determines the relative importance or priority of each index category. Selecting a term associated with what is determined to be an important index category can produce better search results and is generally more useful to the user. In the preferred embodiment, the importance or priority (and thus the particular order) is empirically obtained based on statistics of successful searches.

Furthermore, use of such an ordering concept allows the IR system to appear more intelligent to a user. Obscure, less important questions are not asked as soon as more important questions. Users learn more quickly whether requested information exists within the database by answering the more important questions first.

By maintaining the particular order within the order lookup table 320, rather than associated with the index category itself, the particular order of index categories within a domain can be easily changed. However, the location within memory of where the particular order of index categories is maintained should not be considered as limiting.

The following example illustrates how scaled terms and ordered index categories are used when processing a data inquiry. Referring to the example illustrated in FIG. 3, the Restaurant domain 315a includes several ordered index categories (i.e., the index categories labeled "Cuisine" 310a, "Op. Hours" 310b, and "Amenities" 310d). The terms "Mexican" 305a, "American" 305c, and "Japanese" 305d are shown as being associated with the first most important index category, i.e. the "Cuisine index" category 310a. Thus, the first scripted question prompts a user to select a type of cuisine. The scaled terms used when processing the user's response include only the terms associated with the Cuisine index category 310a.

A user selects one of the scaled terms and then a search of the database 40 is performed using the selected term as part of a query set. If the search produced too much information, the query set may be modified. This modification may occur through the selection of another term by the user. The other term may be associated with the second most important index category.

In the example illustrated in FIG. 3, the second most important index category, Op. Hours 310b, is associated with the terms Mon-Fri 305b and Saturday 305f. If the search from the term in the first index category produces too much information, then the user may be prompted to select one of the terms from this second index category. This selected term then is added to the query set. A further search is performed, using the modified query set, typically reducing the amount of information retrieved from the database 40. Again, if the search produced too much information, the query set may be further modified by selecting another term associated with the third most important index category, "Amenities" 310d, associated with the terms "Valet" 305e and "Smoking" 305i.

The index 37 may also contain other elements useful when creating query sets and searching the database 40. One such other element within the index 37 is a collection of hierarchical group headings 325. These headings 325 are associated with a traditional vertical categorization of the records 300a–i within the database 40. The hierarchical group headings 325 are essentially group headings that can be vertically nested. For example, a high level group heading related to a particular group of records 300a–i in the database may be "Automobiles." This group heading may have lower order group headings of "Automobile-Repair" and "Automobile-Sales." Each of these lower order group headings are related to some of the records 300a–i in the database 40 and are each related to the higher order group heading "Automobile." In this manner, the group headings 325 may form a vertical hierarchy with multiple levels that categorize the information within the records 300a–i of the database 40. When the group headings 325 are used alone or in conjunction with the domains, index categories, and terms, the index 37 becomes a very powerful guide and tool used when searching the database 40 for specific information.

The Information Retrieval System Modules

With this preface on how an index relates to a database, the different software components of the IR system modules 26 are described. The IR system modules 26 are used to process data inquiries, and, more particularly, to process the index 37 when the system dynamically creates a set of questions. Once created, the set of questions are used by the system when searching the database 40 for specific information. FIG. 4 is a diagram illustrating these software components and their interrelationships in the exemplary embodiment of the present invention.

Referring now to FIGS. 1–4, the software modules or components, collectively referred to as the IR system modules 26, along with the index 37, the script files 36, and the database 40 are described in the context of processing a data inquiry (which includes processing the index 37 to dynamically create the set of questions). As previously described, the user interacts with either the stand-alone computer 20 or the distributed computer system 200 using the remote computer 41 or the telephone 42. In either case, the data inquiry from the user is received by the IR system modules 26 via one of the front end modules 33. These front end modules 33 function as an interface for the user.

If the data inquiry is from the remote computer 41, one of the front end modules 33, called a data front end module 400, receives the data inquiry. In one embodiment, the data front end module 400 is a software module resident within the stand-alone computer 20 that interprets data sent by the remote computer 41 via the WAN 43. The data front end module 400 may be an Internet server, preferably a hypertext transfer protocol server, written to support the conventional common gateway interface (CGI) standard. The CGI standard defines a common programming interface for applications communicating with the Internet server and for the Internet server communicating with applications (such as the recognizer module 34 or the dialoger module 35). The data front end module 400 is able to communicate with the remote computer 41 using the proper protocol, such as HTTP. If real-time audio information can be provided to the data front end module 400, the IR system modules 26 can be collectively referred to as a CGI application when servicing data inquiries from the remote computer 41. Those skilled in the art will be familiar with the conventional aspects of HTTP, CGI, and the ability to receive data from a computer network such as the WAN 43. Thus, the data front end module 400 and the recognizer module 34 provide a computer readable data inquiry to the dialoger module 35 from the user.

In another embodiment, the data front end module 400 and the recognizer module 34 may be implemented as an applet that can be downloaded to the remote computer 41. Typically, this embodiment is preferred when real-time audio information cannot be continuously sent to the stand-alone computer 20 from the remote computer 41. In this embodiment, the applet (i.e., the data front end module 400 and the recognizer module 34) operates on the remote computer 41 to receive input from a user and transmits signals over the WAN 43 to the dialoger module 35. In this alternative manner, the applet (operating as the data front end module 400 and the recognizer module 34) provides a computer-readable data inquiry to the dialoger module 35 from the user.

In the preferred embodiment, if the data inquiry from the user is from the telephone 42, a voice front end module 405 (another one of the front end modules 33) receives the data inquiry. In order to link the telephone line and the recognizer module 34, the voice front end module 405, also called an interactive voice response (IVR) module, controls call functions associated with the telephony line card 45. Examples of such call functions include transfer, bridge, and conference. In the preferred embodiment, the voice front end module 405 is produced by Voicetek Corporation of Chelmsford, Mass. Thus, the voice front end module 405 provides a voice or audio signal representing the data inquiry to the recognizer module 34 from the user.

Once the data inquiry is provided to the recognizer module 34, the data inquiry can be processed further. In general, the recognizer module 34 initially processes the data inquiry to determine a domain selected by the user. The recognizer module 34 is able to immediately process the data inquiry if the data inquiry came from the data front end module 400. Otherwise, the recognizer module 34 must first perform voice recognition on the voice signal from the voice front end module 405. Although the preferred recognizer module 34 uses a conventional hidden Markov modeling technique when performing voice recognition, other conventional voice recognition techniques would suffice for the present invention. The important aspect here is that the recognizer module 34 may refer to the scaled terms in the index in order to enhance the voice recognition accuracy and speed.

Initially, a domain is selected from the index. When selecting a domain, one or more scripted questions are sent from the dialoger module 35 and the recognizer module 34 via the appropriate front end module 33. The scripted questions prompt the user via the front end modules 33 (such as the IVR module) to select a domain from the index 37. The terms used by the recognizer module 34 are scaled when interpreting the user's response in order to enhance the accuracy and speed of determining the selected domain.

Once the selected domain is determined, the dialoger module 35 determines the order of index categories in the selected domain. The dialoger module 35 is the software module used to interact with the index 37 and dynamically create the set of questions in the particular order from questions maintained within the script files 36.

Within the dialoger module 35, there is a software module, preferably called a domain sequencer 410, which references the order lookup table 320 within the index 37 in order to determine the particular order of the index categories in the selected domain. With this order of index categories, the domain sequencer 410 uses the questions in the script files 36 to derive signals for prompting the user. In this manner, the questions can essentially be arranged into a set of questions having a question set order corresponding to the order of the index categories in the selected domain.

Once the questions are arranged into the set, another software module within the dialoger module 35, preferably called an autodialoger module 420, identifies the first question in the set. This first question corresponds to the first index category within the selected domain. For example, if the "Restaurant" domain 315a was selected by the user, then the autodialoger module 420 identifies the "Cuisine" index category 310a as the first in the order of index categories in this domain. Thus, the autodialoger module 420 essentially selects a question from the set of questions.

In addition to selecting a question, the autodialoger module 420 also scales the terms to include only the portion of terms associated with the first question in the set (i.e., associated with the corresponding first index category in the domain). This temporary scaling of terms in the index enables enhanced voice recognition speed and accuracy by the recognizer module 34.

After the autodialoger module 420 selects a question and scales the terms, the system prepares to prompt the user. The dialoger module 35 determines if there is any information in the database 40 associated with the first index category by determining if the first index category is active. As previously mentioned, records 300a–i of information populate the database 40 and are related to different terms within the index 37. If there are no records related to any of the terms associated with an index category, the terms and the associated index category are deemed to be inactive. However, if one of the terms (associated with the index category) is associated with a record of information within the database 40, the particular term and the index category are deemed to be active.

In the preferred embodiment, the dialoger module 35 avoids having to actually check the whole database 40 for the active or inactive status of index categories and terms by referring to a special data structure called a TValidate Table 415. Essentially, the TValidate Table validates each term and maintains a census of active terms corresponding to the database 40.

If the dialoger module 35 determines that the first index category is inactive, the corresponding first question is deleted from the set of questions. Nothing is gained from prompting the user with a question corresponding to the inactive index category. In this way, the scripting of questions for the user is dynamic by accounting for active or inactive index categories and terms. After removing the question corresponding to the inactive index category from the set (effectively skipping the question corresponding to the inactive index category), the autodialoger module 420 retrieves the next question in the question set order and checks the next question for active terms.

However, if the dialoger module 35 determines that the first index category is active, the dialoger module 35 creates a signal derived from the question corresponding to the first index category. This signal provides a prompt for the user to select one of the terms associated with the first index category. The signal is routed from the dialoger module 35 through the recognizer module 34 and out the appropriate front end module 33 to the user.

In response to the signal, the user selects one of the terms associated with the first index category via a response signal sent back through the appropriate front end module 33 to the recognizer module 34. The user selects this selected term from the scaled terms. Upon receipt of the response signal, the recognizer module 34 refers only to the portion of the terms in the index 37 that make up the scaled terms in order to recognize the selected term. As a result of referring only to the scaled terms, the recognizer module 34 is able to quickly recognize the selected term. The selected term is then sent to the dialoger module 35.

The dialoger module 35 adds the selected term to a query set used when searching the database 40. Essentially, a query set is a set of one or more elements, such as the selected term, used by the search engine 39 when searching for information within the database 40. After the selected term is added to the query set, the dialoger module 35 dispatches the query set to the search engine module 39 to initiate a search of the database 40. This is preferably accomplished by routing a message with the query set through the recognizer module 34 and through a middleware layer of software 38 (essentially a message routing and file routing layer of software) to the search engine module 39.

The search engine module 39 receives the query set and begins a search of the database 40 based upon the contents of the query set. The search engine module 39 searches the database 40 by communicating with the database 40 via the middleware layer of software 38 to find information within the database related to each element (e.g., the selected term) in the query set. In the preferred embodiment, the database 40 is a conventional database maintained in a conventional format used by SYBASE, a database application marketed by Sybase Inc. of Emeryville, Calif. However, any ANSI Sequel compliant database can be used with an embodiment of the present application.

Additionally, the search engine module 39 typically uses the elements in the query set to create a conventional structured query language (SQL) query with which to search the SYBASE database 40. SQL is essentially a set of operators, expressions, and commands used to create and access databases. Those skilled in the art will be familiar with the ability to create an SQL query based upon particular elements, such as the selected term.

Once the search engine module 39 receives the results of the search, the search engine module 39 sends the resulting information back to the dialoger module 35 (via the middleware 38 and the recognizer module 34). If the amount of information received by the dialoger module 35 (from the search engine module 38) is less than a predetermined threshold amount, the information is delivered to the user via a signal sent out via the appropriate front end module 33. In the preferred embodiment, the predetermined threshold amount depends upon the origin of the data inquiry. If the data inquiry comes from a user on the remote computer 41 (via a text inquiry), the predetermined threshold amount of information (e.g., found records 300a–i from the database 40) is preferably ten. If the data inquiry comes from a user on the telephone 42 (via a voice inquiry), the predetermined threshold amount of information is preferably five. The predetermined threshold of five is used because a user most likely will have trouble retaining additional information beyond this threshold amount when it is presented in an audio format back to the user.

However, if the amount of information exceeds the predetermined threshold amount, then the next question is identified by the autodialoger module 420 and the validation for active terms, scaling of the vocabulary of terms and searching of the database 40 is repeated.

In summary, these software components make up the preferred IR system modules 26 which process data inquiries and interact with the script files 36, the index 37 and the database 40. The dialoger module 35 is capable of processing the index 37 in order to arrange questions in a script file 36 according to an order of active index categories in a selected domain of information. By dynamically arranging the questions into a set of ordered questions, depending on the domain selected, there is no need to laboriously create and maintain static scripts for each domain. Additionally, the dialoger module 35 is capable of scaling the terms to include only those associated with a particular index category. The scaled terms are used when prompting the user with a question corresponding to the particular index category and receiving the user's response. In this manner, recognition of the selected item, such as a selected term, is enhanced for speed and accuracy due to the scaled vocabulary of terms.

Dynamically Creating the Set of Questions Using the Index

FIGS. 5 and 6 are flow diagrams illustrating steps from the preferred methods for dynamically processing an index to create a set of questions used when searching a database for information. Referring now to FIGS. 1–5, the preferred method 500 begins at step 505 where the index, such as the exemplary index 37 shown in FIG. 3, is provided with one or more information domains.

At step 510, one of the domains is selected from the index, preferably by the receipt of a signal from a user. The contents of the signal indicate which domain is selected. At step 515, the terms within the index are scaled to include only the terms associated with the selected domain. For example, the terms in the index are scaled to include only the terms associated with the "Restaurant" domain 315a if it is selected from the exemplary index 37.

At step 520, the order of the index categories associated with the selected domain is determined. In the preferred embodiment, this particular order is maintained within the order lookup table 320 and is determined when the domain sequencer 410 references the order lookup table 320 within the index 37. The particular order may be easily altered by modifying the order lookup table 320. This is easier to accomplish when compared to the offline editing required when using large static scripts.

At step 525, the questions associated with each index category in the selected domain are arranged in a question set order that corresponds to the order of the index categories in the selected domain. The arrangement of questions in this question set order is generally referred to as the set of questions associated with the selected domain. These questions represent the dynamically created set of questions that a user would encounter when searching for information within the selected domain.

At step 530, if there are any inactive index categories within the domain (i.e., within the selected domain, there are index categories having no active terms associated with them), then step 530 proceeds to step 535. For example, if there are no records 300a–i in the database 40 related to the terms "Valet" 305e and "Smoking" 305i, the index category called "Amenities" 310d is deemed inactive within the "Restaurant" domain 315a. Otherwise, if there are no inactive index categories within the selected domain, step 530 proceeds directly to step 540.

At step 535, at least one of the index categories within the selected domain is inactive. At this point, it does not help to ask questions about or select terms from index categories which have no related information within the database 40. Therefore, step 535 deletes any question from the set if the question corresponds to an inactive index category within the selected domain before proceeding to step 540. In this manner, the set of questions is dynamic by containing only questions aimed at available information within the database 40.

At step 540, a prompt is provided to the user. The prompt includes a scripted question based upon one of the questions in the set. The particular question depends on the order of the questions in the set. This prompt is preferably implemented as a signal transmitted by the dialoger module 35 through the recognizer module 34 and the appropriate front end module 33.

At this point, the user has received the prompt signal either by telephony signals to the telephone 42 or by data communication signals to the remote computer 41. The user responds to the prompt from step 540 typically by sending a response signal back to the dialoger module 35. Thus, at step 545, terms in the selected domain are selected based on the scripted question in the prompt.

At step 550, the database 40 is searched using the selected term as an element in a query set. In the preferred embodiment, the query set is then sent to the search engine 39 which performs the search of the database 40 based on the elements within the query set. As mentioned previously, the information found during this search is then typically transmitted back to the dialoger module 35 from the search engine 39 via the middleware software 38.

At step 555, the information found during the search at step 550 which is related to the selected terms is delivered to the user. In the preferred embodiment, this is accomplished by sending a signal to the user reporting the search results. Thus, the data inquiry from the user is processed by dynamically processing the index to create a set of questions and dynamically scaling the available vocabulary of terms. In this way, efficient information retrieval can be achieved.

Figure 6A:
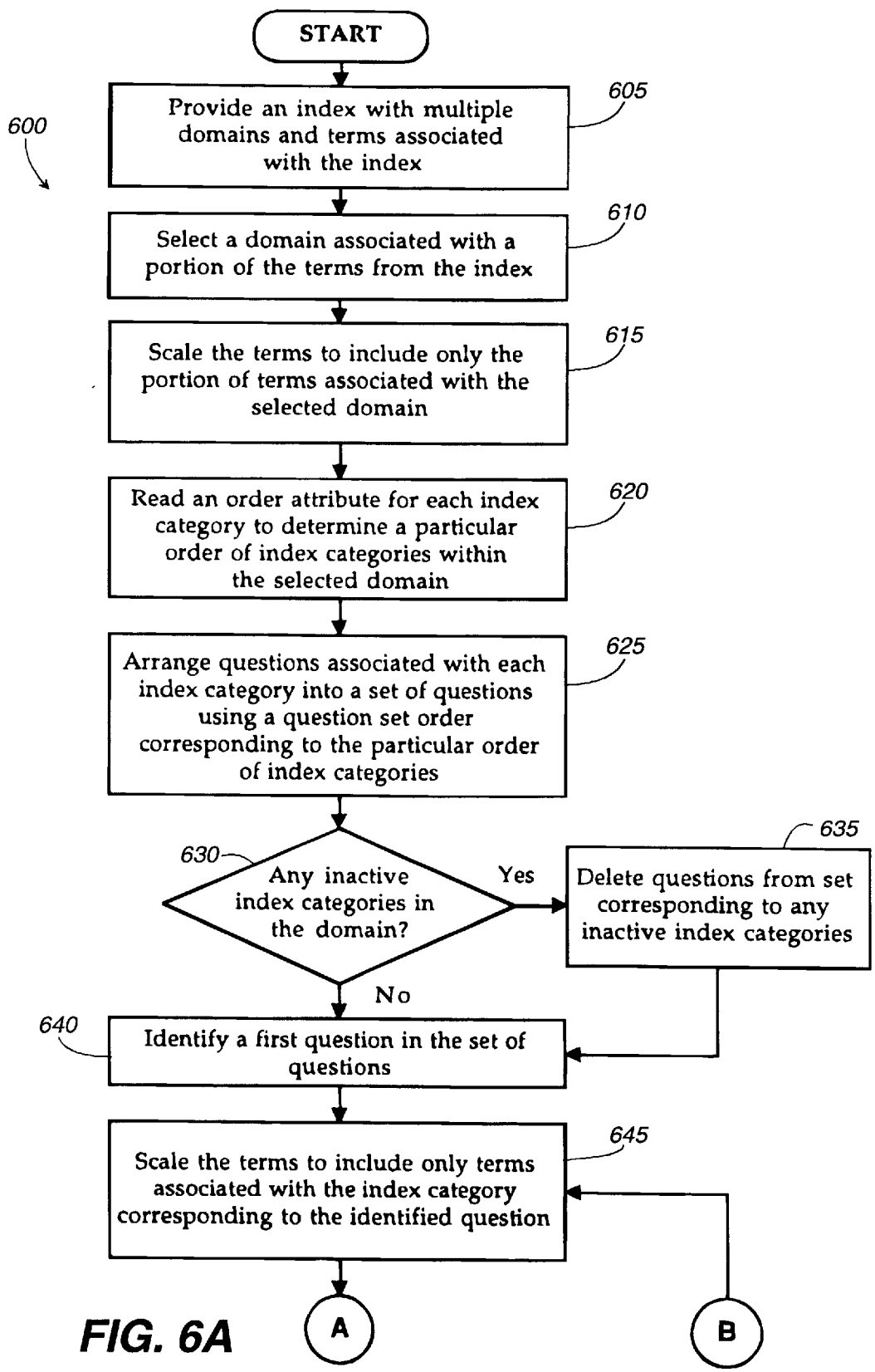
FIGS. 6A–6B are detailed flow diagrams illustrating steps of the preferred method for dynamically processing an index to create a set of questions.
Figure 6B:
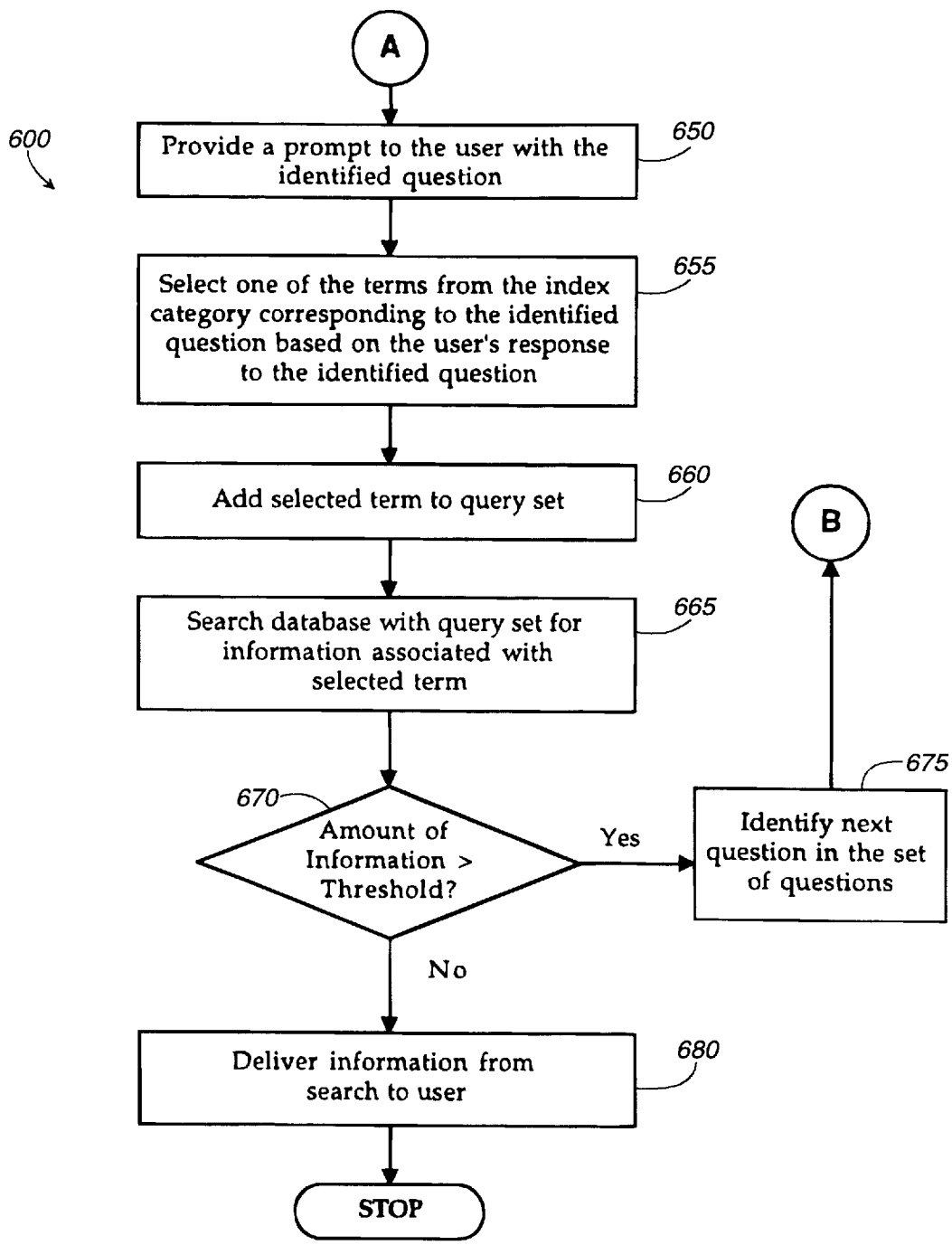

In more particular detail, FIGS. 6A–6B are more detailed flow diagrams illustrating the steps of the preferred method for dynamically processing an index to create a set of questions. Referring now to FIGS. 1–4 and 6A, the preferred method 600 begins at step 605 where the index, such as the exemplary index 37 shown in FIG. 3, is provided with one or more information domains.

At step 610, one of the domains is selected from the index, preferably by the receipt of a signal from a user. The contents of the signal would indicate which domain is selected. The selected domain is associated with a portion of the terms in the index. At step 615, the terms within the index are scaled to include only the portion of the terms associated with the selected domain.

At step 620, the particular order of the index categories associated with the selected domain is determined. In the preferred embodiment, an order attribute associated with each index category in the selected domain is read by the domain sequencer 410. These order attributes are collectively referred to as the particular order of the index categories. Order attributes for each index category in each domain are preferably maintained within the order lookup table 320.

At step 625, the questions associated with the index categories in the selected domain are arranged into a set of questions. The questions within the set have a question set order that corresponds to the order of the index categories in the selected domain. The set of questions represent the dynamically created set of questions that a user encounters when searching for information within the selected domain.

At step 630, if there are any inactive index categories within the selected domain, then step 630 proceeds to step 635. Otherwise, step 530 proceeds directly to step 540.

At step 635, at least one of the index categories within the selected domain has been found to be inactive. As previously mentioned, it does not help to ask questions at this point about or select terms from index categories which have no related information within the database 40. Therefore, step 635 deletes any question from the set if the question corresponds to any inactive index category within the selected domain before proceeding to step 640. In this manner, the set of questions is dynamic in that the set contains only questions aimed at currently available information within the database 40. This advantageously allows the IR system module 26 to appear intelligent from a user's perspective.

At step 640, a first question is identified from the set of questions. In the preferred embodiment, the autodialoger module 420 identifies this first question and reads the question from the script file 36.

At step 645, the terms in the index are scaled to include only the terms associated with the identified question. In other words, only those terms associated with the index category corresponding to the identified question are included in the vocabulary of terms typically used by the recognizer module 34. After scaling the terms (i.e., a grouping of the terms 300a–i within the index 37), step 645 proceeds to step 650 on FIG. 6B.

Referring now to FIGS. 1–4, 6A, and 6B, the preferred method 600 continues at step 650 where a prompt is provided to the user. The prompt is derived from the identified question. This prompt is preferably implemented as a signal transmitted by the dialoger module 35 through the recognizer module 34 and the appropriate front end module 33.

At step 655, one of the terms associated with the identified question is selected. In other words, the selected term is one of the terms associated with the index category corresponding to the identified question. Typically, the user responds to the prompt from step 650 by sending a response signal to the dialoger module 35. Thus, at step 655, the term is selected based upon on the user's response to the scripted question in the prompt.

At step 660, the selected term is then added to a query set, preferably by the dialoger module 35. In the preferred embodiment, the query set contains different elements used by the search engine 39 to match when searching the database 40.

At step 665, the database 40 is searched using the query set including the selected term. In the preferred embodiment, the query set is sent to the search engine 39 which performs the search of the database 40 based on the elements within the query set. As mentioned previously, the information found during this search is then typically transmitted back to the dialoger module 35 from the search engine 39 via the middleware software 38.

At step 670, if the amount for information returned during the search of the database exceeds a predetermined threshold, step 670 proceeds to step 675 where the next question in the set is identified and step 675 proceeds directly back to step 645. As previously mentioned, the predetermined threshold amount of information is typically ten records for text inquiries and five for audio inquiries. This situation arises when too much information (i.e., records in the database) is related to or matches the current elements in the query set. By asking a scripted question about the next category of information in the domain, the search is likely to be further narrowed producing less but more focused information.

However, if the amount of information returned from the search of the database does not exceed the predetermined threshold, step 670 proceeds to step 680 where the information found during the search at step 665 is delivered to the user. In the preferred embodiment, this is accomplished by sending a signal to the user reporting the search results. Thus, the data inquiry from the user is processed by dynamically processing the index to create a set of questions and dynamically scaling the available vocabulary of terms.

Conclusion

From the foregoing description, it will be appreciated that an embodiment of the present invention provides a system and method for dynamically processing an index in order to create a set of questions used when processing a data inquiry from a user. The index 37, a structured guide for use when searching the database 40, has different information domains. After one of these domains is selected, a particular order of the index categories within the selected domain is determined, typically by referring to the order lookup table 320 within the index 37. There are questions corresponding to each index category within the selected domain. These questions are used to prompt the user. Only the questions corresponding to active index categories are arranged into the set of questions having a question set order corresponding to the particular order of the index categories. In an iterative process, the first question is identified and used to prompt the user to select a term from a scaled down vocabulary of terms (i.e., only those terms associated with the first question and corresponding first index category). Upon selecting the term, a query element based on the selected term is added to the query set and a search of the database 40 is performed by the search engine module 39. If there is too much information returned from the search, the next question is identified and the iterative process is repeated.

The foregoing system may be conveniently implemented in one or more program modules having code that is based upon the flow diagrams in FIGS. 5, 6A, and 6B. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of dynamically processing an index 37 associated with a database 40 of classified advertising information in order to create a set of questions used when a user transmits a data inquiry from either a remote computer 41 or a telephone 42. However, those skilled in the art will understand that the principles of the present invention apply to any tasks or processes that must efficiently retrieve information from a structured collection of the information.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for dynamically processing an index to create a set of questions for use in an information retrieval system, comprising the steps of:

providing said index, said index having at least one domain;

selecting a domain from said index as a selected domain, said selected domain having a plurality of index categories, and each of said plurality of said index categories being associated with at least one question so as to provide said set of questions;

determining a particular order associated with said plurality of index categories of said selected domain; and arranging said set of questions into a question set order that corresponds to said particular order associated with said plurality of index categories, thereby dynamically creating said set of questions.

2. The method of claim 1 further comprises the steps of:

if a database contains information associated with an index category of said plurality of index categories, then defining said index category as an active index category; and defining said set of questions to include a question only if said question corresponds to said active index category.

3. The method of claim 1, wherein said step of providing said index further comprises providing said index having a plurality of terms, a portion of said plurality of terms being associated with said selected domain.

4. The method of claim 3 further comprising the step, in response to said selecting step, of scaling said plurality of terms to include only said portion of said terms associated with said selected domain.

5. The method of claim 3 further comprising the step, after said arranging step, of providing a prompt with a question from said set of questions.

6. The method of claim 5, wherein said question is the first question according to said question set order, and wherein said step of providing said prompt further comprises providing said prompt with said first question.

7. The method of claim 5 further comprising the steps, after said prompting step, of:
   receiving a response to said prompt;
   selecting one of said portion of said plurality of terms as a selected term based upon said response; and
   searching a database for information related to said selected term.

8. The method of claim 7 further comprising the step, in response to said searching step, of delivering said information.

9. The method of claim 7 further comprising, after said searching step, the step of delivering said information if the amount of said information is less than a predetermined threshold.

10. The method of claim 7 further comprising, after said searching step, the step of providing said prompt with another of said questions if the amount of said information exceeds a predetermined threshold.

11. The method of claim 10, wherein said another of said questions is the next question according to said question set order, and wherein said step of providing said prompt further comprises providing said prompt with said next question.

12. The method of claim 1, wherein said step of selecting said selected domain further comprises receiving a first signal, said first signal indicating a selection of said selected domain.

13. The method of claim 12 further comprising the step of transmitting a second signal that provides a prompt, said second signal being derived from a question from said set of questions according to said question set order.

14. The method of claim 13 further comprising, in response to transmitting said second signal, receiving a third signal, said third signal indicating a desired term.

15. The method of claim 14, wherein said step of providing said index further comprises providing said index having a plurality of terms, a portion of said plurality of terms being associated with said selected domain; and
   further comprising the step of selecting one of said portion of said plurality of terms as a selected term based upon said desired term from said third signal.

16. The method of claim 15 further comprising the steps of:
   searching a database for information associated with said selected term, said database associated with said index; and
   transmitting a fourth signal to said user, the content of said fourth signal providing said information associated with said selected term.

17. A method for dynamically processing an index to create a set of questions for use in an information retrieval system, comprising the steps of:
   (a) providing said index, said index having a plurality of domains and a plurality of terms;
   (b) selecting one of said domains as a selected domain, said selected domain having a plurality of index categories, at least one of said plurality of index categories being associated with a portion of said plurality of terms, and each of said plurality of index categories being associated with at least one question so as to provide said set of questions;
   (c) determining a particular order associated with said plurality of index categories of said selected domain;
   (d) arranging said set of questions into a question set order that corresponds to said particular order associated with said plurality of index categories;
   (e) identifying the first question in said set of questions according to said question set order as an identified question;
   (f) providing a prompt, said prompt derived from said identified question;
   (g) based upon a response to said prompt, selecting one of said plurality of terms as a selected term;
   (h) searching a database for information associated with said selected term; and
   (i) if the amount of said information exceeds a predetermined threshold, repeating steps (e)–(h) for the next question in said set of questions according to said question set order, thereby creating and using said set of questions.

18. The method of claim 17 further comprising the steps, after step (d), of:
   (d1) determining if any of said index categories are inactive, one of said index categories being inactive if said database does not contain any information associated with said one of said index categories; and
   (d2) deleting from said set of questions those of said questions corresponding to those of said index categories which are determined to be inactive.

19. The method of claim 17 further comprising the step, in response to step (c), of scaling said plurality of terms to include only said portion of said terms associated with said selected domain.

20. The method of claim 17 further comprising the step, in response to step (e), of scaling said plurality of terms to include only those of said portion of said plurality of terms associated with one of said plurality of index categories corresponding to said identified question as scaled terms; and
   wherein step (g) comprises selecting said selected term from said scaled terms.

21. The method of claim 17, wherein said index is a data structure which maintains a plurality of group headings; and
   wherein said step of providing said index further comprises providing that each of said plurality of group headings is hierarchically-related to each other so as to create a hierarchy of group headings, and that each of said plurality of group headings corresponds to information in said database.

22. The method of claim 17, wherein step (b) further comprises receiving a first signal, said first signal indicating a selection of said selected domain.

23. The method of claim 22, wherein step (f) further comprises transmitting a second signal that provides a prompt, said second signal being derived from said identified question; and
   wherein step (g) further comprises selecting said selected term based upon a third signal received in response to said prompt.

24. The method of claim 23 further comprising the step of transmitting a fourth signal to said user after step (i), said fourth signal providing said information stored in said database associated with said selected term.

25. A computer system for dynamically processing an index to create a set of questions, comprising:
   a processor;
   a memory storage device coupled to said processor, said memory storage device maintaining a script file and said index, said index having a selected domain, said selected domain associated with said script file, said selected domain having a plurality of index categories, each of said plurality of index categories being associated with one of a plurality of questions, and each of said plurality of questions stored within said script file;

a communications interface coupled to said processor, said communications interface for communicating with a remote device; and said processor being operative:
  to determine a particular order that is associated with said index categories of said selected domain, and
  to arrange said plurality of questions into said set of questions for interacting with said remote device, said set of questions having a question set order that corresponds to said particular order.

26. The computer system of claim 25, wherein an index category from said plurality of index categories is active if a database maintained on said memory storage device contains information associated with said index category; and
  wherein, said set of questions includes only those of said questions that correspond to those of said plurality of index categories that are active.

27. The computer system of claim 25, wherein said memory storage device also maintains a plurality of terms, a portion of said plurality of terms being associated with an index category from said plurality of index categories; and
  wherein said processor is further operative to scale said plurality of terms to include only said portion of said plurality of terms.

28. The computer system of claim 25, wherein said processor is further operative:
  to transmit a signal to said remote device, said signal being derived from at least one of said questions in said set of question; and
  to select one of a plurality of terms associated with said selected domain as a selected term based upon a response signal received from said remote device in response to said signal.

29. The computer system of claim 28, wherein said processor is further operative:
  to search a database maintained on said memory storage device for information associated with said selected term; and
  to transmit said information to said remote device.

30. A computer system for dynamically processing an index to create a set of questions, comprising:
  a processor;
  a memory storage device coupled to said processor, said memory storage device for maintaining:
    a database,
    an index associated with said database, said index having a plurality of domains and a plurality of terms, and
    a plurality of script files, each of said plurality of script files respectively corresponding to each of said plurality of domains;
  a communications interface coupled to said processor, said communications interface for communicating with a remote device; and
  said processor being operative to:
    (a) in response to a first signal received from said remote device via said communications interface, select one of said domains as a selected domain, said selected domain having a plurality of index categories, each of said plurality of index categories being associated with one of a plurality of questions, each of said plurality of questions stored within one of said plurality of script files corresponding to said selected domain, and said selected domain being associated with a portion of said plurality of terms,
    (b) determine a particular order associated with said plurality of index categories,
    (c) arrange said plurality of questions into said set of questions with a question set order that corresponds to said particular order,
    (d) identify the first question in said set of questions according to said question set order as an identified question,
    (e) prompt said remote device with said identified question,
    (f) receive a response from said remote device,
    (g) select one of said plurality of terms as a selected term based upon on said response,
    (h) search said database on said memory storage device for information associated with said selected term, and
    (i) if the amount of said information exceeds a predetermined threshold, perform said functions (d)–(h) for the next question according to said question order.

31. The computer system of claim 30, wherein said processor is further operative to determine if any of said plurality of index categories are inactive, an index category from said plurality of index categories is inactive if said database does not contain any information associated with said index category; and
  wherein said processor is further operative to delete from said set of questions those of said plurality of questions corresponding to those of said plurality of index categories which are determined to be inactive.

32. The computer system of claim 30, wherein said processor is further operative to scale said plurality of terms to include only said portion of said plurality of terms associated with said selected domain.

33. The computer system of claim 30, wherein said processor is further operative to scale said plurality of terms to include only those terms of said portion of said plurality of terms which are associated with an index category corresponding to said identified question; and
  wherein said processor is further operative to select said selected term from said scaled terms.

34. The computer system of claim 30, wherein said index is a data structure stored on said memory storage device which maintains a plurality of group headings, each of said plurality of group headings being hierarchically-related to each other so as to create a hierarchy of group headings, and that said each of said plurality of group headings corresponds to information in said database.

35. The computer system of claim 30, wherein said processor is further operative to transmit a second signal to said remote device, said second signal being derived from said identified question; and
  wherein said processor is further operative to select said selected term based upon a third signal received from said remote device.

36. The computer system of claim 35, wherein said processor is further operative to transmit a fourth signal to said remote device, said fourth signal providing said information stored in said database associated with said selected term.

37. A distributed computer system for dynamically processing an index to create a set of questions, comprising:
  a backend computer;
  a backend memory storage device coupled to said backend computer, said backend memory storage device maintaining:

a database, a script file maintaining a plurality of questions, an index associated with said database, said index having a selected domain, said selected domain corresponding to said script file, said selected domain having a plurality of index categories, and each of said plurality of index categories being associated with one of said plurality of questions;

a frontend computer, said frontend computer having a memory and being in communication with said backend computer via a network, and said frontend computer providing a service communication interface for communicating with a remote device;

said backend computer being operative to provide said frontend computer with access to said database, said index, and said script file; and said frontend computer being operative to:
- copy said database, said index, and said script file from said backend memory storage device into said memory of said each of said frontend computers as a copied database, a copied index, and a copied script file, respectively,
- determine a particular order associated with said plurality of index categories of said selected domain, and
- arrange said questions into said set of questions for interacting with said remote device via said service communication interface, said set of questions having a question set order that corresponds to said particular order.

38. The distributed computer system of claim 37, wherein said set of questions includes only those of said questions in said copied script file that correspond to those of said index categories that are active, an index category from said plurality of index categories is active if said copied database contains information associated with said index category.

39. The distributed computer system of claim 37, wherein said copied index in said memory of said frontend computer further includes a plurality of terms, a portion of said plurality of terms being associated with at least one of said plurality of index categories; and wherein said frontend computer is further operative to scale said plurality of term to include only said portion of said plurality of terms associated with said selected domain.

40. The distributed computer system of claim 37, wherein said frontend computer is further operative to transmit a signal derived from at least one of said plurality of questions, said signal transmitted to said remote device via said service communication interface, thereby interacting with said remote device.

41. The distributed computer system of claim 40, wherein said frontend computer is further operative:
- based upon the content of a response signal received from said remote device in response to the transmission of said signal, to select a term as a selected term, said selected term being associated with said selected domain; and
- to search said copied database for information associated with said selected term.

42. The computer system of claim 41, wherein said frontend computer is further operative to provide said information to aid remote device.

43. The distributed computer system of claim 37, wherein said backend computer is operative to update said database, said index, and said script file on said backend memory storage device.

* * * * *